Figure 4:
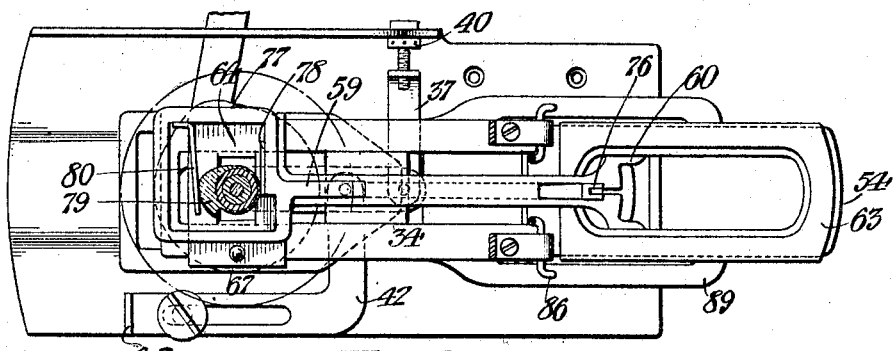

April 8, 1924. 1,489,263
A. B. MATTINGLY
ATTACHMENT FOR SEWING MACHINES
Original Filed Jan. 20, 1916  4 Sheets-Sheet 1
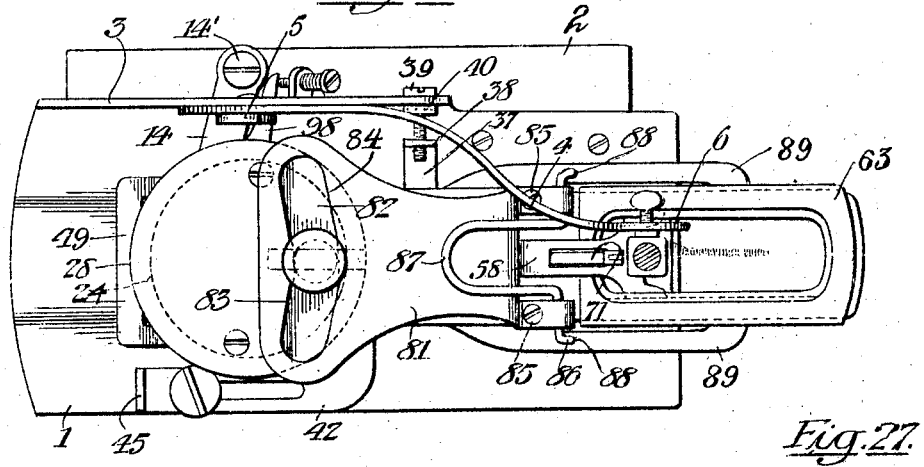
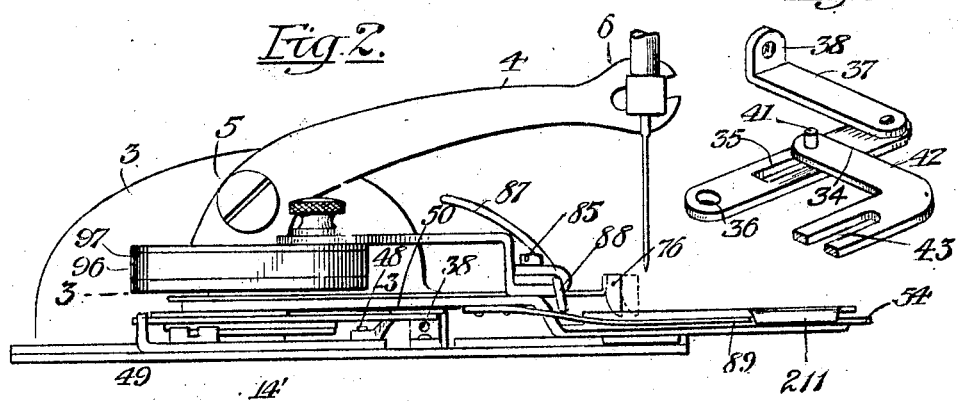
Witnesses:
B. Cypres
A. Writer
Inventor
Albertus B Mattingly April 8, 1924.
A. B. MATTINGLY
ATTACHMENT FOR SEWING MACHINES
Original Filed Jan. 20, 1916  4 Sheets-Sheet 3
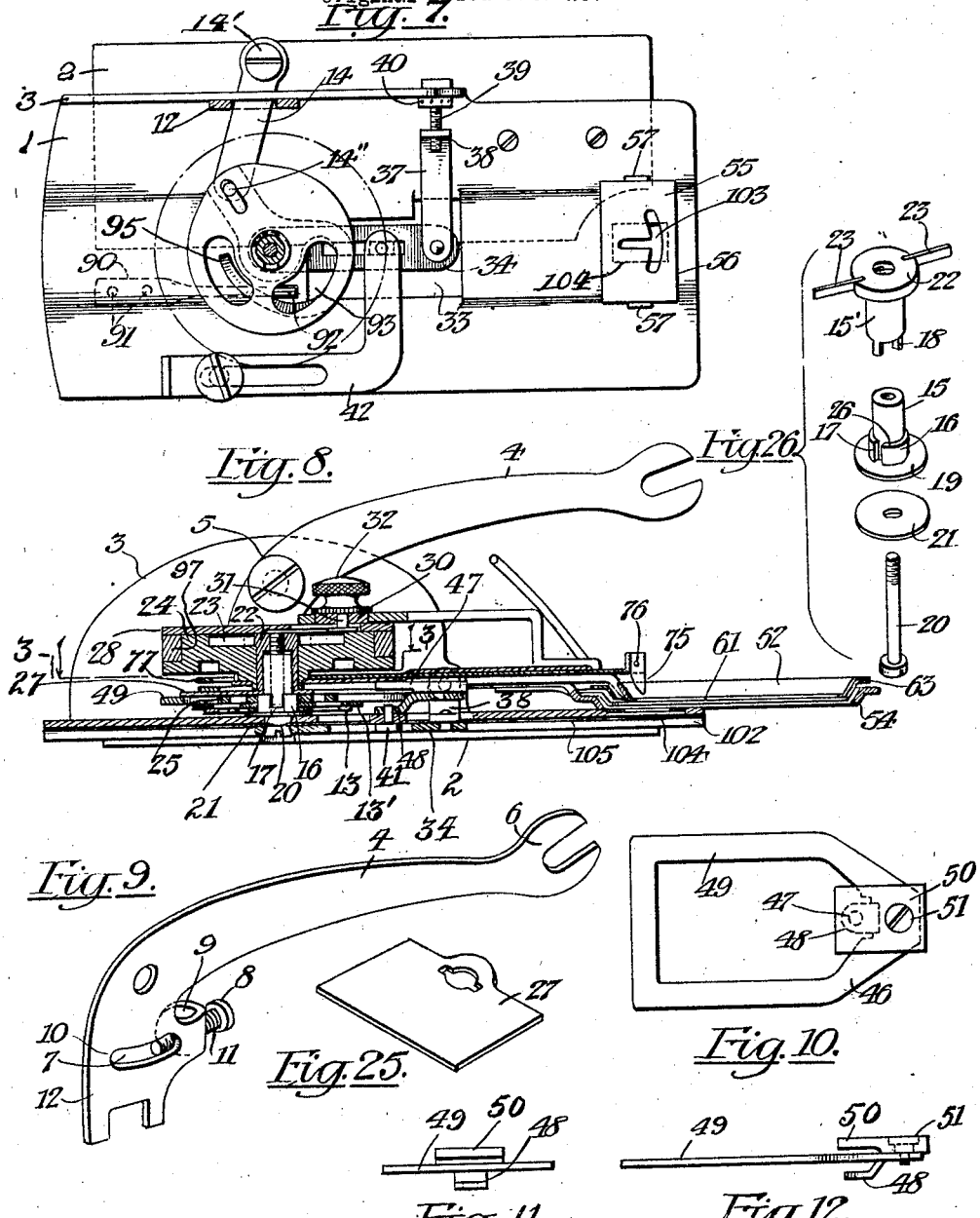
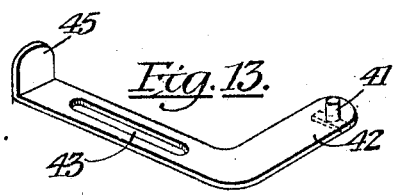

April 8, 1924.
A. B. MATTINGLY
ATTACHMENT FOR SEWING MACHINES
Original Filed Jan. 20, 1916    4 Sheets-Sheet 4
1,489,263
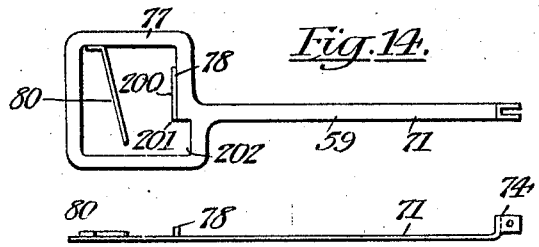
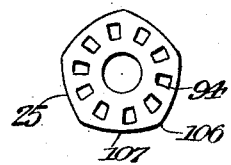
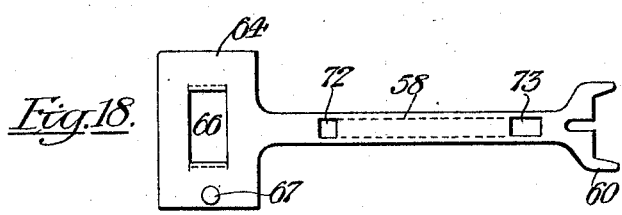
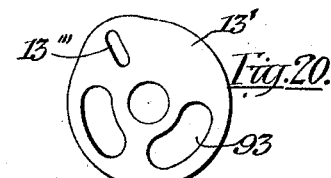
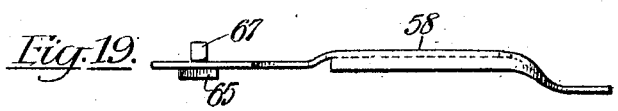
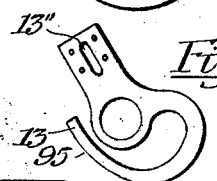
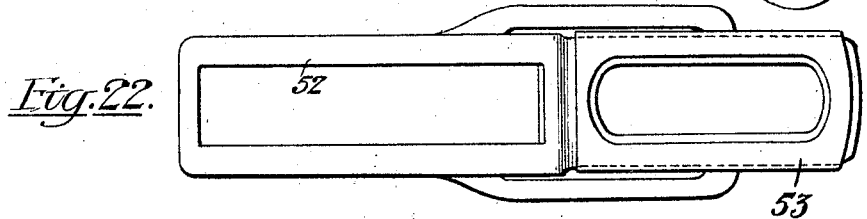
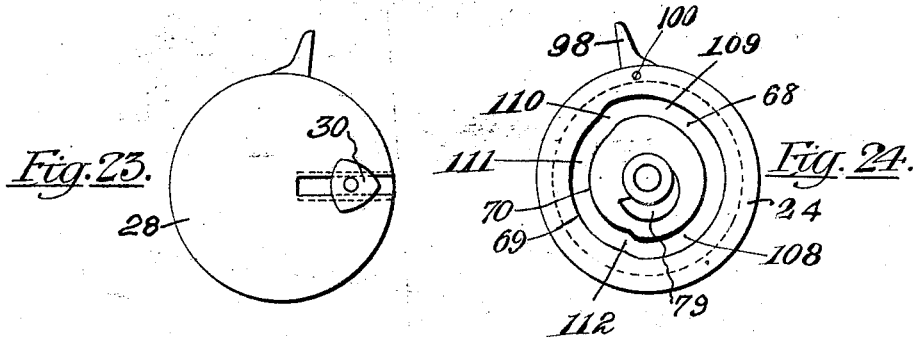

Patented Apr. 8, 1924.

1,489,263

UNITED STATES PATENT OFFICE.

ALBERTUS B. MATTINGLY, OF NEW YORK, N. Y.

ATTACHMENT FOR SEWING MACHINES.

Substitute for application Serial No. 73,165, filed January 20, 1916. This application filed March 4, 1920. Serial No. 363,200½.

*To all whom it may concern:*

Be it known that I, ALBERTUS B. MATTINGLY, citizen of the United States, and resident of New York, in the county of New York and State of New York, have invented certain new and useful Improvements in Attachments for Sewing Machines, of which the following is a specification.

This invention relates to an improvement in attachments for sewing machines, and the inventor is aware that the device is of a nature similar to that disclosed in British Letters Patent No. 17,153 of 1905, to Hills, and United States Patents No. 412,081, to Fletcher, No. 446,736, to Fletcher, No. 990,601, to Seward, and No. 990,610, to Turck, and the object is to overcome some of the objectionable features of these devices and to further improve the same.

This application is a substitute for application Serial Number 73,165, filed January 20, 1916.

The principal objects are to provide a device of this character to automatically cut or slit the cloth just in advance of the stitching or binding of the button-hole so that the needle may pass alternately through the cloth and then through the slit or cut, thus causing the thread to be brought through the cut and make a perfect binding of the raw edges of the work, and to provide a means for positively actuating the knife with a quick and decisive action at the proper periods to make the cut the proper length according to the length of the button-holes, and to have the length of cut automatically adjust itself with the adjusting of the device for the length of the button-hole.

The further objects are to provide a device of this character which will provide a means for supplying more stitches around the loop of the button-hole, or in other words to more evenly distribute the stitches around the contour of the button-hole than has heretofore been accomplished, and to provide a means whereby a more perfect adjustment of the cutting device as regards its alinement relative to the needle of the sewing machine is obtained.

The further objects are to provide a device of this character which by its construction is considerably reduced in height and thereby doing away with the necessity of removing the face plate of the sewing machine to adjust the presser bar, and by the construction of the base plate obviating the necessity of removing the feed dogs of the sewing machine.

The still further objects are to provide an improved ratchet device for effecting the lateral vibration of the work clamp, to produce the overstitch of the edge of the button-hole, and to form other parts of the device by the stamping process, screw machines, which is the cheapest method of manufacturing devices of this class.

A still further object is to provide a device of this kind in which the knife can be adjusted to cut a line or slit in which the needle will follow with its inside lines of its vibrating motion on its forward movement and also perform the same function on its backward movement in forming or stitching the button-hole.

With these and other objects in view, it will be seen that I accomplish the foregoing, by referring to the accompanying drawings, forming a part of this specification; but I do not wish to confine myself to the exact construction shown, as I have, for the sake of clear illustration, exaggerated some of the parts, especially in the side elevations, and the cam faces of the yoke upon which the eccentric cam works.

Figure 5:
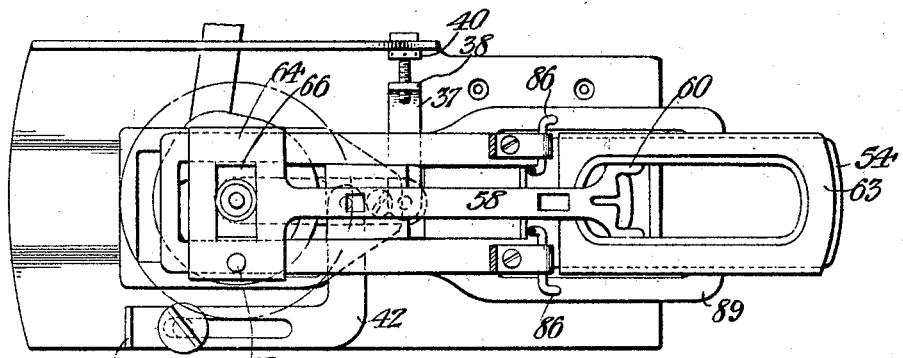
Figure 6:
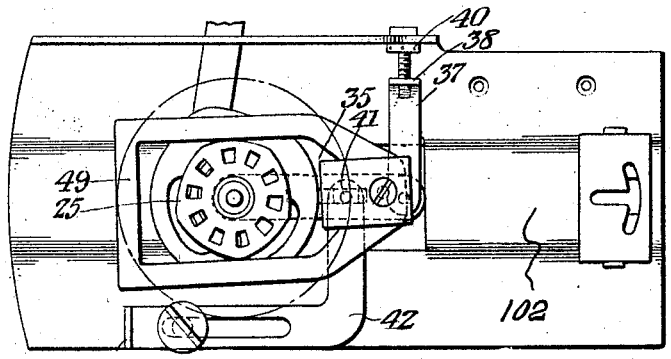

In the accompanying drawings, showing one embodiment of my invention, Figure 1 is a plan view of the device; Fig. 2 is a side elevation; Fig. 3 is a horizontal section taken on the line 3—3 of Fig. 2, and showing diagrammatically the operating cam friction drive or eccentric in dotted lines; Fig. 4 is a similar view to Fig. 3, showing more clearly the operating means for the knife; Fig. 5 is a similar view to Fig. 4, with the knife and its operating means removed; Fig. 6 is a similar view to Fig. 5, with the work clamp and knife guide and also the retaining washer removed, and showing the vibrating mechanism; Fig. 7 is a similar view to Fig. 6, showing a part of the vibrating mechanism removed and showing the pawl plate and the adjusting means for the knife, and the adjusting means for controlling the length of throw of the vibrator; Fig. 8, is a central vertical section of the device; Fig. 9 is a perspective view of the operating lever; Figs. 10, 11 and 12 are three views of the vibrator; Fig. 13 is a perspective of the vibrator carrier; Figs. 14 and 15 are two views of the knife carrier; Figs. 16 and 17 are two views of the ratchet cam; Figs. 18 and 19 are two views of the shield for the knife carrier, and integral therewith the stripper plate for the needle, and the guide for the work clamp; Figs. 20 and 21 are two views, one of the pawl plate and one of the pawl for operating the ratchet cam; Fig. 22 is a plan of the work clamp; 23 is a top plan of the eccentric operating mechanism, showing the adjustable eccentric cam; Fig. 24 is a bottom plan of the eccentric operating mechanism, showing the knife cam and the race cam for operating the work clamp for forming the contour of the button-hole when operated in conjunction with the eccentric cam; Fig. 25 is a perspective view of a counter plate upon which the rear end of the work clamp rests and operates; Fig. 26 is a group of perspective views of the several parts which form the main stud or pivot post; Fig. 27 is a perspective view of the members which form the adjusting means of the cutting device, with a portion of the carrier of the vibrator broken away and clearly showing the stud or pivot upon which the vibrator vibrates.

I provide a suitable base plate 1, which is secured to a rear throat plate 2 of the sewing machine in any suitable manner, but preferably screwed thereto, as shown in Fig. 1 of the drawings.

The base plate 1 is provided with an ear 3, which is upwardly turned and carries the operating lever 4, which rocks on a pivot 5 formed of a large screw, the lever 4 being provided with a bifurcated end 6, which engages the shank of the screw of the tightening collar of the needle bar of the sewing machine. The lever 4 is further provided with an arc-shaped slot 7, through which passes the arm of the friction clutch, which receives its movement from the screw 8 in the ear 9 and the rear end 10 of the slot 7. The screw 8 is frictionally held from turning by the pressure of the spring 11 against its head and the ear 9. The lever 4 is further provided with an arm or downward extension which has a bifurcated end 12 which operates the pawl 13 and the pawl plates 13' by the lever 14, which is mounted on the throat plate 2 by means of a body screw forming a pivot 14'. In the forward end of the lever 14 is a pin 14'' which operates the pawl 13 and the pawl plate 13' through the slots 13'' and 13'''.

The base plate 1 is further provided with a pivot or stud 15 made up of two parts, 15 and 15'. The lower portion 15 of the stud is hollow and has its upper and lower ends turned down, leaving a body portion 16 which is slotted on opposite sides forming grooves 17 for the reception of the tongs 18 of the part 15', and a washer 19 is forced on to the lower part of the part 15. The washer 19 forms a substantial base for holding the stud in a vertical position on the base plate, which is done by the screw 20 passing through the washer 21 and the base plate 1 and the hollow part 15 and being screwed into the part 15', which locks all of the several parts assembled on the stud in position by its head 22, in which are secured two springs 23 which act as friction brakes in connection with the cam member 24, the function of which will be described later.

Rotatably mounted upon the stud and supported by the flange 19 are the pawl 13 and the pawl plate 13', (which are swung in an arc by the end 12 of the lever 4 through the lever 14 and its pin 14'' in a forward and backward movement). Rotatably mounted upon the stud and resting upon the pawl plate 13' is a ratchet cam 25 which receives a step by step rotary movement from the upturned end 13 of the pawl plate 13'' extending through a slot in the plate 13', and engaging in turn the notches 94 of the ratchet cam 25, and above this cam 25, resting on a shoulder 26 of the stud, is the retaining washer 27, and then the eccentric disk 28 secured to the cam member 24, and carrying the adjustable eccentric cam 30, which is held in position by a T-bolt 31 and lock nut 32. The top of the stud 15 is provided with a pair of friction springs 23 which act against the inner wall formed by the recess in the top of the cam member 24, the springs 23 and the part 15' being prevented from turning by the ears 18 in the recesses 17.

The base plate 1 is further provided with a cut-away portion 33 in which is located a linked member 34 having a slot 35 and a circular opening 36 which fits the head of the screw 20 which acts as a pivot. Secured to the forward end of the member 34 by a pivot is a link 37 with an upturned end 38, which is tapped for the screw 39 which passes through a hole in the ear 3 and is provided with a lock nut 40. By turning the screw 39 in to pull or push the link 37, the slot 35 can be made to line up perfectly with the needle and the stud 15 and held in this position by the lock nut 40. The slot 35 is for receiving the bottom end of the pin 41 of the L-shaped member 42, which is provided with a slot 43 for adjusting it upon the base plate 1 by the screw 44, and it is provided with an upturned ear 45 for adjusting it while the screw 44 is loose. The pin 41 is tight in the member 42 and its upper end forms a pivot for the vibrator 46, which is connected thereto by the hole 47 in the ear 48, and when assembled the ear 48 is capable of passing under the pawl plate 13', while the yoke 49 straddles the ratchet cam 25 and rests upon the pawl plate 13'.

The vibrator 46 is provided with a pivoted block 50 which fits the inner faces of the rear yoke 52 of the work clamp 53, which straddles the stud and rests on the retaining washer 27, which, working in conjunction with the cam member 24, keeps the forward part 54 of the work clamp in proper contact with the base plate 1 and prevents the bottom stripper plate 55 from leaving the slotted way 56 in the base as it is oscillated by the work clamp in connection with the ears 57.

Mounted upon the yoke 52 is the guide or shield 58 for the knife carrier 59, having its front end 60 in the form of a stripping plate which slides in a groove or space 61 formed by a plate 62, which is forced into the upper jaw 63 of the work clamp. The rear end of the shield 58 is enlarged, forming a guide 64, by means of the downwardly extending flanges 65 fitting the yoke 52, which moves back and forth relatively to the stud 15. The rectangular opening 66 is of a width equal to the diameter of the upper end of the stud 15, which acts as a pivot for the work clamp and passes through the opening 66 and prevents the shield from moving back and forth but allows its rear end to be drawn laterally of the stud in both directions by the pin 67 working in the cam groove 68 formed by the cams 69 and 70 on the underside of the cam member 24, (thus causing the vibrator to vibrate or oscillate the work clamp in the shape of a button-hole while the eccentric is moving the work clamp back and forth the length of the button-hole.)

Mounted upon the guide or shield 64 is the knife carrier 59, which has its spring portion 71 passing through the openings 72 and 73 of the shield 58. The spring portion 71 has its outer end bent upward, with two ears 74 forming a pair of jaws for the knife 75, which is held by a pin or screw 76. The rear end of the spring portion 71 is formed in a rectangular frame or yoke 77 having a flange 78 forming a cam-engaging face 200 against which the cam 79 fixed on the under face of cam member 24 works, and the flexible portion 80 insures the keeping of the cam 79 and the cam-engaging face 200 always in contact. At a predetermined point the flange 78 forming the cam-engaging face 200 is cut away or ends at 201, and the yoke is so formed at this point as to have a clearance space 202 to prevent the yoke frame from hitting the cam 79 when the flexible part 80 of the yoke causes the yoke and knife to move quickly back between the strokes of the needle and thus prevent the needle bar from striking the knife several times while it is being moved back from under the needle bar. This quick movement is caused by the cam 79, which holds the yoke forward for the proper time, having an abrupt face 203, so that while it is revolving on the stud the point 204 passes the point 201 on the cam-engaging face 200. The face 203 is so formed as to not interfere with the cam-engaging face 200 and this allows the yoke to move back its full stroke at this point, which is accomplished on the upward stroke of the needle bar.

The work clamp is provided with an eccentric yoke or member 81 having an elongated opening 82 in which works the adjustable eccentric cam 30 against the faces 83 and 84. It will be noted that I have shown the elongated opening 82 converging in the direction of the center line and the forward part of the attachment. (The revolving of the cam 30 around the stud causes the work clamp to be moved back and forth relatively to the needle.) The member 81 is secured to the work clamp 53 by means of screws 85, and the forward end is bifurcated and bent so as to form bearings for the locking member 86, which is formed of a bent wire having a central portion 87 which acts in the capacity of a hand lever to operate the two end portions 88 which act upon the spring extensions 89 (of the upper jaw 63) and which are riveted to the rear yoke 52 of the work clamp.

Mounted on the underside of the base plate 1 (see Fig. 7) is a spring member 90, which is held in position by the rivets 91 and has an upwardly extending portion 92 which extends through the opening 93 of the pawl plate 13' and into the holes 94 of the ratchet cam 25. This prevents the ratchet cam from being turned backwards by friction of the pawl 95 slipping out of any one of the holes 94 upon its backward movement after it has revolved the ratchet cam one tenth of a turn.

The cam member 24 together with the eccentric disk 28 is revolved by a friction device 96 consisting of a ring 97 located on the cam member 24, and supported by a flange at the bottom of the said member, and in turn carrying a friction dog 98, which turns on a pivot 100 and is held in its biting position against the surface of the cam member 24 by a spring 99. The operation of the friction device will be described later on.

The base plate is further bent or formed so as to have a raised portion 102 through the center thereof, upon which the bottom of the work clamp slides and on which is cut the channel or groove 56 for the stripper plate 55, which has an opening 103 some-what in the shape of a T. Beneath the stripper plate 55 in the base plate is an opening 104 to allow the needle to perform its functions. The raised portion 102 forms a channel or groove 105, (see Fig. 8), which allows the free action of the feed dogs of the sewing machine and raises the device enough to permit the cutting of the cloth without the knife hitting the dogs on its downward stroke.

The operation of the device is very simple. The rear throat plate of the sewing machine is removed and the device is slipped in its place by the insertion of the throat plate 2 which is screwed to the device, and the shank of the screw which holds the needle in position passes into the bifurcated end 6 of the lever 4. When the attachment is first put on the machine the screw 44 and lock nut 40 are loosened and the screw 39 turned to bring the knife in line with the needle. The lock nut 40 is then tightened up. This holds the slot 35 in a perfect line with the needle and then the member 42 can be adjusted (for any width of vibration for the work clamp). The screw 44 is then tightened and the attachment is ready for operation. It will be understood that after the knife has been once adjusted for the needle the attachment can be removed if desired and put back without the knife being readjusted, and the vibrating movement of the work clamp can also be changed to take more or less bite when the attachment is adjusted to make a larger or smaller button-hole, without disturbing the adjustment of the knife.

To make a button-hole, the work clamp is set by moving the sewing machine until the extreme back position is reached. The lever 87 of the locking member 86 is then pressed forward, (that is in the direction of the needle), and forces the ends 88 backwards and thus relieves the pressure of the springs 89, which allows the jaws of the work clamp to open. The cloth is inserted between the jaws and the lever 87 pushed back to its original position, thus causing the upper jaw to force the cloth down into the concave opening in the lower jaw, and at the same time the flanges 211 of the upper jaw prevent the slipping of the cloth on the lower jaw and thus causes the cloth to be stretched like a drum head. With the work clamp in this position the knife is in the dotted position shown in Fig. 2, and upon running the machine the needle bar strikes the top of the knife and forces it through the cloth each time the needle descends, until the work clamp is almost at its extreme forward position, when the cam 79 is at the point where the point or nose 204 passes the point 201 and the flexible portion 80 of the yoke causes the yoke to move swiftly back and draw the knife out of line with the needle bar before it has time to descend and strike it again, (as shown in full lines in Fig. 2), thus preventing further cutting, and the knife remains in this position until the button-hole is finished.

The stud 15 is the pivot center upon which the work clamp is oscillated by the vibrator 46. With each upward movement of the needle bar the lever 4 is raised, which in turn swings the pawl plate 13' sufficiently to have the pawl 95 enter one of the holes 94 of the ratchet cam and revolve it one tenth of a revolution, which causes one of the pointed cam faces 106 to act on one side of the yoke 49 and cause the vibrator to swing to one side on its pivot 41. The face 107 prevents any overthrow of the vibrator. The next stroke of the needle causes one of the faces 106 to act on the opposite side of the yoke 49 and swing it in the opposite direction. This movement of the vibrator causes the work clamp to be oscillated on the stud 15, such motion being transmitted through the block 50 of the vibrator. While the vibrator is oscillating the work clamp in one direction or the other with every stroke of the needle to make the needle pass first through the cloth and then through the cut, the eccentric cam is slowly shoving the work clamp forward the length of the button-hole, the speed of the forward movement being regulated by the screw 8, which strikes the arm or lever 98 of the friction clutch and forces the ring 97 back a predetermined amount, (upon the downward stroke of the needle). The rear end 10 of the slot 7, upon reaching the arm 98, (on the upward movement of the needle), forces the ring to move forward and the nose 113 of the arm 98 to bite into the cam member 24 and cause it and the revolving disk to revolve, which causes the cam 30 to act upon the face 84 of the yoke member 81 and shove the work clamp forward, and when the cam, on the last half of the revolution of the revolving disk 28, works against the face 83 it causes the work clamp to be drawn backwards. It will be noted that the faces 83, 84 are inclined relatively to the center line of the work clamp. This causes the cam 30 which makes one complete revolution each time a buttonhole is made, and to cause the work clamp to move forward faster on the first quarter and slower on the second quarter of its revolution, and in moving back the work clamp the third quarter of the revolution is at the same speed as the second, and the fourth quarter is the same speed as the first. This causes less stitches to be put in the first and last parts made of the button-hole and more stitches around the loop forming the eyelet which part is made during the second and third quarters of the revolution of the cam 30, and thus extra stitches are placed where they are needed, and this gives a more even appearance to the stitches of the button-hole. The revolving of the cam member 24 causes the pin 67 to shift the rear end of the work clamp relatively to the ear 48 and the stud 15. On the first part of the revolution of the cam member 24 the pivot pin 67 is in that position of the cam groove 68 designated by the numeral 108, which causes the first straight part of the button-hole to be made. The parts 109 and 110 cause the pin 67 to first move further away from the stud and then closer to the stud than it was at the start. (This causes the eyelet of the button-hole to be made), and the part 111 (causes the pin to stand still until the last straight part of the button-hole is finished), and the movement of the pin caused by the part 112 causes the two straight sides of the button-hole to be stitched together.

In order to make a large button-hole, the eccentric cam 30 is located out at the periphery of the disk 28, and the nearer the center of the disk 28 the cam 30 is located the smaller will be the button-hole; but no matter what the length of the button-hole is the knife will always move from under the needle bar at the same period of the operation of making the button-hole and will be pushed under the needle bar at the starting point, so that the slot will always be the proper length. When a large button-hole is made its overstitch should be of greater length than for a small one, so that by loosening the screw 44 and drawing the member 42 back it causes the block 50 of the vibrator to be moved nearer to the stud 15 upon which the work clamp oscillates, and causes a longer throw of the work clamp, or by moving the member 42 forward the throw of the work clamp is decreased.

Certain parts of the present mechanism are not claimed therein, but are claimed in application Serial Nos. 353,107; 353,108; 336,256; 218,076; 352,980; 336,257; 346,235; and 346,236.

I claim as my invention:

1. The combination with the frame and the work clamp mounted to reciprocate thereon and to vibrate laterally, of a stud, a ratchet cam mounted on the stud, means for advancing the ratchet cam step by step, the work clamp having a vibrating means connecting it to the ratchet cam, means in the form of a V-shaped slot for increasing the speed of the forward and back movement of the work clamp on the first and fourth quarters and decreasing the speed on the second and third quarters of the cycle to cause more stitches to be put in one end of the button hole than in the other end of the buttonhole, a cutting device carried by the work clamp and movable thereon, and means for moving the cutting device in both directions.

2. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means in the form of a V-shaped slot for increasing the speed of the forward and back movement of the work clamp on the first and fourth quarters and decreasing the speed on the second and third quarters of the cycle, to cause more stitches to be put in one end of the button hole than in the other end of the buttonhole, a cutting device carried by the work clamp and movable thereon, and means for moving the cutting device in both directions, with a quick and decisive movement.

3. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for preventing any backward throw of the ratchet cam, means in the form of a V-shaped slot for increasing the speed of the forward and back movement of the work clamp on the first and fourth quarters and decreasing the speed on the second and third quarters of the cycle to cause more stitches to be put in one end of the button hole than in the other end of the buttonhole, a cutting device carried by the work clamp and movable thereon, and means for moving the cutting device in both directions with a quick and decisive movement.

4. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to make an eyelet end, means in the form of a V-shaped slot for increasing the speed of the forward and back movement of the work clamp on the first and fourth quarters and decreasing the speed on the second and third quarters of the cycle to cause more stitches to be put in one end of the button hole than in the other end of the buttonhole, a cutting device carried by the work clamp and movable thereon, and means for moving the cutting device in both directions with a quick and decisive movement.

5. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, means in the form of a V-shaped slot for increasing the speed of the forward and back movement of the work clamp on the first and fourth quarters and decreasing the speed on the second and third quarters of the cycle to cause more stitches to be put in one end of the button hole than in the other end of the buttonhole, a cutting device carried by the work clamp and movable thereon, and means for moving the cutting device in both directions with a quick and decisive movement.

6. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to make an eyelet end, means for increasing or decreasing the overstitch or the lateral throw of the work clamp, means in the form of a V shaped slot for increasing the speed of the forward and back movement of the work clamp on the first and fourth quarters and decreasing the speed on the second and third quarters of the cycle to cause more stitches to be put in one end of the button hole than in the other end of the button hole, a cutting device carried by the work clamp and movable thereon, and means for moving the cutting device in both directions.

7. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, means for increasing or decreasing the overstitch or the lateral throw of the work clamp, means in the form of a V-shaped slot for increasing the speed of the forward and back movement of the work clamp on the first and fourth quarters and decreasing the speed on the second and third quarters of the cycle, to cause more stitches to be put in one end of the button hole than in the other end of the button hole, a cutting device carried by the work clamp and movable thereon, and means for moving the cutting device in both directions.

8. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to make an eyelet end, means for increasing or decreasing the overstitch or the lateral throw of the work clamp, means in the form of a V shaped slot for increasing the speed of the forward and back movement of the work clamp on the first and fourth quarters and decreasing the speed on the second and third quarters of the cycle to cause more stitches to be put in one end of the button hole than in the other end of the button-hole, means for adjusting the vibrator means relatively to the stud and needle, a cutting device carried by the work clamp and movable thereon, and means for moving the cutting device in both directions.

9. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, means for increasing or decreasing the overstitch or the lateral throw of the work clamp, means in the form of a V shaped slot for increasing the speed of the forward and back movement of the work clamp on the first and fourth quarters and decreasing the speed on the second and third quarters of the cycle to cause more stitches to be put in one end of the button hole than in the other end of the button hole, means for adjusting the vibrator means relatively to the the stud and needle, a cutting device carried by the work clamp and movable thereon, and means for moving the cutting device in both directions.

10. The combination with the frame and the work clamp mounted to reciprocate thereon and to vibrate laterally, of a stud, a ratchet cam mounted on the stud, means for advancing the ratchet cam step by step, the work clamp having a vibrating means connecting it to the ratchet cam, means in the form of a V shaped slot for increasing the speed of the forward and back movement of the work clamp on the first and fourth quarters and decreasing the speed on the second and third quarters of the cycle to cause more stitches to be put in one end of the button hole than in the other end of the button hole, a cutting device carried by the work clamp and movable thereon, and means in the form of two members acting in conjunction with each other, one a rotatable member mounted on the said stud and the other a slidable member forming a part of the cutting device and spring actuated, for moving the cutting device in both directions with a quick and decisive movement.

11. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for adjusting the vibrating means into perfect alinement with the said stud and the needle without interfering with adjustment of the vibrating means relatively to the stud, a cutting device carried by the work clamp and movable thereon, means in the form of a curved slot for causing more stitches to be placed in one end of the buttonhole than in the other end of the buttonhole, and means in the form of two members acting in conjunction with each other, one a rotatable member mounted on the said stud and the other a slidable member forming a part of the cutting device and spring actuated, for moving the cutting device in both directions.

12. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for preventing any backward throw of the ratchet cam, means for adjusting the vibrating means into perfect alinement with the said stud and the needle without interfering with adjustment of the vibrating means relatively to the stud, a cutting device carried by the work clamp and movable thereon, means in the form of a curved slot for causing more stitches to be placed in one end of the buttonhole than in the other end of the buttonhole, and means in the form of two members acting in conjunction with each other, one a rotatable member mounted on the said stud and the other a slidable member forming a part of the cutting device and spring actuated for moving the cutting device in both directions.

13. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to make an eyelet end, means for adjusting the vibrating means into perfect alinement with the said stud and the needle without interfering with adjustment of the vibrating means relatively to the stud, a cutting device carried by the work clamp and movable thereon, means in the form of a curved slot for causing more stitches to be placed in one end of the buttonhole than in the other end of the buttonhole, and means in the form of two members acting in conjunction with each other, one a rotatable member mounted on the said stud and the other a slidable member forming a part of the cutting device and spring actuated, for moving the cutting device in both directions with a quick movement.

14. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, means for adjusting the vibrating means into perfect alinement with the said stud and the needle without interfering with adjustment of the vibrating means relatively to the stud, a cutting device carried by the work clamp and movable thereon, means in the form of a curved slot for causing more stitches to be placed in one end of the buttonhole than in the other end of the buttonhole, and means in the form of two members acting in conjunction with each other, one a rotatable member mounted on said stud and the other a slidable member forming a part of the cutting device and spring actuated, for moving the cutting device in both directions with a quick movement.

15. The combination with the frame and the work clamp mounted to reciprocate thereon and to vibrate laterally, of a stud, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to form an eyelet end, means for increasing or decreasing the overstitch or the lateral throw of the work clamp, means for adjusting the vibrating means into perfect alinement with the said stud and the needle without interfering with adjustment of the vibrating means relatively to the stud, a cutting device carried by the work clamp and movable thereon, means in the form of a curved slot for causing more stitches to be placed in one end of the buttonhole than in the other end of the buttonhole, and means in the form of two members acting in conjunction with each other, one a rotatable member mounted on the said stud and the other a slidable member forming a part of the cutting device and spring actuated, for moving the cutting device in both directions.

16. The combination with the frame and the work clamp mounted to reciprocate thereon and to vibrate laterally, of a stud, a ratchet cam mounted on the stud, a pawl plate for advancing the ratchet cam step by step, the work clamp having a vibrator connecting it to the ratchet cam, means for preventing any backward throw of the ratchet cam, means for shifting at certain periods the work clamp relative to its pivot so as to form a button-hole with a loop to form an eyelet end, means for increasing or decreasing the overstitch or the lateral throw of the work clamp, a slotted member pivoted on the said stud and means for adjusting its slot into perfect alinement with the stud and needle, the vibrator pivot being adjustable in said slot relatively to the stud, a cutting device carried by the work clamp and movable thereon, and means in the form of two members acting in conjunction with each other, one a rotatable member mounted on the said stud and the other a slidable member forming a part of the cutting device and spring actuated, for moving the cutting device in both directions.

17. The combination with the frame and the work clamp mounted to reciprocate thereon and to vibrate laterally, of a stud, a cutting device operatively mounted upon said work clamp, a ratchet cam mounted on the stud, means for advancing the ratchet cam step by step, the work clamp having a vibrating means connecting it to the ratchet cam, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

18. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

19. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for preventing any backward throw of the ratchet cam, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

20. The combination with the frame and the work clamp mounted to reciprocate thereon and to vibrate laterally, of a stud, a cutting device operatively mounted upon said work clamp, a ratchet cam mounted on the stud, a pawl for advancing the ratchet cam step by step, the work clamp having a vibrating means connecting it to the ratchet cam, means for shifting at certain periods the work clamp relative to its pivot to form a button-hole with a loop to make an eyelet end, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

21. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

22. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to make an eyelet end, means for increasing or decreasing the overstitch or the lateral throw of the work clamp, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

23. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, means for increasing or decreasing the overstitch or the lateral throw of the work clamp, and means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole.

24. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for shifting at certain periods the work clamp relative to its pivot to form a button-hole with a loop to make an eyelet end, means for increasing or decreasing the overstitch or the lateral throw of the work clamp, means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole, and means for adjusting the vibrator means relatively to the stud and needle.

25. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for preventing any backward throw of the ratchet cam, means for shifting at certain periods the work clamp relative to its pivot to form a button-hole with a loop to make an eyelet end, means for increasing or decreasing the overstitch or the lateral throw of the work clamp, means in the form of a V shaped slot with a curved apex for increasing the speed of the forward and back movement of the work clamp on the first and fourth quarters and decreasing the speed on the second and third quarters of the cycle in order to place more stitches in the eyelet end of the buttonhole than in the other end of the buttonhole, and means for adjusting the vibrator means relatively to the stud and needle.

26. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrating means connecting it to the ratchet cam, means for placing more stitches in one end of the button hole than in the other end of the button hole, and means for adjusting the vibrating means into perfect alinement with the said stud and the needle without interfering with adjustment of the vibrating means relatively to the stud.

27. The combination with the frame and the work clamp mounted to reciprocate thereon and to vibrate laterally, of a stud, a cutting device operatively mounted upon said work clamp, a ratchet cam mounted on the stud, a pawl plate for advancing the ratchet cam step by step, the work clamp having a vibrator connecting it to the ratchet cam, means for shifting at certain periods the work clamp relative to its pivot so as to form a button-hole, a slotted member pivoted on the said stud, and means for adjusting its slot into perfect alinement with the stud and needle, the vibrator pivot being adjustable in said slot relatively to the stud for increasing or decreasing the overstitch or the lateral throw of the work clamp.

28. In an attachment of the character stated, the combination of stitching mechanism, a reciprocal work clamp for advancing work to the stitching mechanism, a cutter carried by the work clamp and operable for work incision in advance of the stitching operation and mechanism for shifting said clamp at predetermined periods to form a button-hole with a loop to make an eyelet end, said mechanism provided with means in the form of a V-shaped slot with a curved apex for placing more stitches in one end of the button hole than in the other end of the button hole.

29. A mechanism as specified in claim 28 in combination with means for so oscillating the work clamp as to cause the stitching mechanism to pass a thread first through the work as incised and then through the incision and so on to provide an overstitching or binding for the raw edge of the incision.

30. A mechanism as specified in claim 29 in combination with means for increasing the number of said overstitches in the formation of an eyelet whereby an even appearance of stitching is effected throughout.

Signed at New York, in the county of New York and State of New York, this 2nd day of March A. D. 1920.

ALBERTUS B. MATTINGLY.